United States Patent
Letoumelin et al.

(10) Patent No.: US 10,479,263 B2
(45) Date of Patent: Nov. 19, 2019

(54) LIGHTING MODULE COMPRISING AT LEAST ONE REMOVABLE LIGHT SOURCE

(71) Applicant: VALEO VISION, Bobigny (FR)

(72) Inventors: Remi Letoumelin, Bobigny (FR); Thomas Canonne, Bobigny (FR)

(73) Assignee: VALEO VISION, Bobigny (FR)

( * ) Notice: Subject to any disclaimer, the term of this patent is extended or adjusted under 35 U.S.C. 154(b) by 130 days.

(21) Appl. No.: 15/464,812

(22) Filed: Mar. 21, 2017

(65) Prior Publication Data

US 2017/0267161 A1    Sep. 21, 2017

(30) Foreign Application Priority Data

Mar. 21, 2016    (FR) ..................................... 16 52418

(51) Int. Cl.
| | |
|---|---|
| *B60Q 1/06* | (2006.01) |
| *F21S 41/19* | (2018.01) |
| *F21S 41/147* | (2018.01) |
| *F21S 41/39* | (2018.01) |
| *F21S 41/60* | (2018.01) |
| *F21S 45/10* | (2018.01) |

(52) U.S. Cl.
CPC .............. *B60Q 1/06* (2013.01); *F21S 41/147* (2018.01); *F21S 41/19* (2018.01); *F21S 41/192* (2018.01); *F21S 41/39* (2018.01); *F21S 41/60* (2018.01); *F21S 45/10* (2018.01)

(58) Field of Classification Search
CPC . B60Q 1/06; F21S 41/147; F21S 41/19; F21S 41/192; F21S 41/39; F21S 41/60; F21S 45/10

USPC ......................................................... 362/512
See application file for complete search history.

(56) References Cited

U.S. PATENT DOCUMENTS

| | | | |
|---|---|---|---|
| 1,772,177 | A | 8/1930 | Dake |
| 1,960,922 | A | 5/1934 | Richard |
| 2008/0008427 | A1 | 1/2008 | Takeda et al. |
| 2010/0195345 | A1 | 8/2010 | Sugie |
| 2014/0022807 | A1 | 1/2014 | Watanabe et al. |

(Continued)

FOREIGN PATENT DOCUMENTS

| | | |
|---|---|---|
| DE | 10 2007 031 241 A1 | 1/2008 |
| EP | 2 213 934 A2 | 8/2010 |

(Continued)

OTHER PUBLICATIONS

French Preliminary Search Report dated Dec. 21, 2016 in French Application 16 52418, filed Mar. 21, 2016 ( with English translation of categories of Cited Documents).

*Primary Examiner* — Elmito Breval
(74) *Attorney, Agent, or Firm* — Oblon, McClelland, Maier & Neustadt, L.L.P.

(57) ABSTRACT

The present invention relates to a lighting module for a motor vehicle, the lighting module comprising: an optical means, a support for the optical means, at least one light source housed in the lighting module. The light source is removable and includes light emitting means, a mechanical support for the light emitting means, movement means for moving the optical means, which are arranged so as to allow the optical means to be moved between a locked position for holding the light source on the support for the optical means and an unlocked position for removing the light source from the lighting module.

14 Claims, 6 Drawing Sheets

(56) References Cited

U.S. PATENT DOCUMENTS

| | | | |
|---|---|---|---|
| 2014/0198512 A1* | 7/2014 | Letoumelin | F21V 7/08 |
| | | | 362/487 |
| 2014/0226355 A1 | 8/2014 | Blandin et al. | |
| 2015/0070920 A1 | 3/2015 | Kim | |
| 2015/0070921 A1 | 3/2015 | Kim | |

FOREIGN PATENT DOCUMENTS

| | | |
|---|---|---|
| EP | 2 690 350 A2 | 1/2014 |
| FR | 2 982 006 A1 | 5/2013 |

* cited by examiner

LIGHTING MODULE COMPRISING AT LEAST ONE REMOVABLE LIGHT SOURCE

FIELD OF THE INVENTION

The present invention relates to a lighting module for a motor vehicle and to a light source associated with the lighting module.

It finds a particular but nonlimiting application in illuminating devices, such as motor vehicle headlamps.

BACKGROUND OF THE INVENTION

A lighting module for a motor vehicle comprises, as known to those skilled in the art:
an optical means;
a support for the optical means;
at least one light source housed in the lighting module.
The light source comprises:
light emitting means;
a mechanical support for the light emitting means.

The life of a light source, such as a semiconductor emitting chip is generally greater than 3000 hours of operation. In the event of a failure, the issue of replacing this light source then arises. In order to replace a defective light source, it is known practice to remove the entire lighting module, namely the optical means and the defective light source.

One disadvantage with this state of the art is that replacing the entire lighting module causes elements, such as the optical means, to be scrapped, these being elements which are not necessarily defective. The user then has to purchase a new complete lighting module each time a light source becomes defective, making the operation of replacing the lighting module more expensive.

In that context, the present invention seeks to redress the aforementioned disadvantage.

GENERAL DESCRIPTION OF THE INVENTION

To this end, the invention proposes a lighting module for a motor vehicle, said lighting module comprising:
an optical means;
a support for the optical means;
at least one light source housed in the lighting module, said light source being removable and comprising:
light emitting means;
a mechanical support for the light emitting means;
movement means for moving the optical means, which are arranged so as to allow the optical means to be moved between:
a locked position for holding said light source on the support for the optical means; and
an unlocked position for removing said light source from the lighting module.

Thus, as will be seen in detail hereinafter, by using movement means for moving the optical means so as to allow this optical means to be moved between a locked position and an unlocked position, it is possible to free up some space in order to remove the defective light source from the lighting module. More particularly, the space freed up by moving the optical means allows the mechanical support on which the light emitting means rest to be slid without the need to remove the optical means. Only the light source is then replaced, thereby reducing the overall cost of this maintenance operation.

According to some nonlimiting embodiments, the lighting module may further comprise one or more additional features from among the following:

In one nonlimiting embodiment, the movement means are designed to move the optical means with respect to the support of the optical means. In other words, the optical means is mobile in relation to its support.

In one nonlimiting embodiment, the optical means is a reflector, a lens, a light guide or a collimator.

In one nonlimiting embodiment, the support for the optical means is a heat sink.

In one nonlimiting embodiment, the light emitting means comprise a semiconductor emitting chip.

In one nonlimiting embodiment, in the locked position, the light emitting means of the light source are positioned in a focal zone of the optical means.

In one nonlimiting embodiment, the optical means comprises at least one end stop for blocking the positioning of the light source in the lighting module In one nonlimiting embodiment, the movement means are designed to move the optical means translationally and/or rotationally.

In one nonlimiting embodiment, the movement means comprise a cam system.

In one nonlimiting embodiment, said cam system comprises:
a cam comprising a slot;
a pivot secured to the support for the optical means and designed to allow the cam to rotate with respect to said optical means support;
a stud secured to the optical means and designed to slide in the slot of the cam as said cam rotates.

In one nonlimiting embodiment, the slot of the cam comprises a locking notch for blocking the cam in the position in which the optical means is locked.

In one nonlimiting embodiment, the slot of the cam is oblong in shape.

In one nonlimiting embodiment, the slot of the cam is curved.

In one nonlimiting embodiment, the slot comprises a first part extending with a constant first radius centered with respect to the pivot, and a second part extending along a second radius that evolves.

In one nonlimiting embodiment, the movement means further comprise a secondary pivot secured to the support for the optical means and designed to allow the optical means to rotate about this secondary pivot as the cam rotates about the pivot.

In one nonlimiting embodiment, the movement means comprise a secondary cam system, the two cam systems being arranged facing one another on each side of the optical means.

In one nonlimiting embodiment, said at least one light source further comprises grab means on said mechanical support.

Also proposed is a light source designed to be housed in a lighting module for a motor vehicle, said light source comprising:
light emitting means;
a mechanical support for the light emitting means;
grab means on said mechanical support.

In one nonlimiting embodiment, the grab means are:
a notch; or
a lug; or
a bent rod.

In one nonlimiting embodiment, the light emitting means comprise a semiconductor emitting chip.

BRIEF DESCRIPTION OF THE FIGURES

The invention and the various applications thereof will be better understood from reading the following description and from studying the accompanying figures.

DESCRIPTION OF EMBODIMENTS OF THE INVENTION

Figure 1:
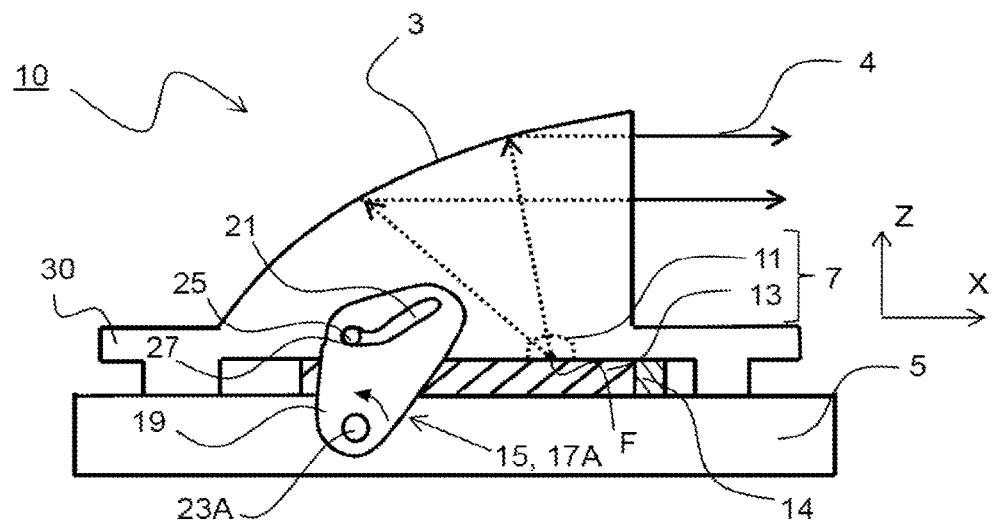
FIGS. 1 and 2 schematically depict a lighting module for a motor vehicle according to a first nonlimiting embodiment of the invention.

Elements that are identical, in structure or in function, and that appear in various figures maintain the same references, unless specified otherwise. The lighting module 10 for a motor vehicle according to the invention is described with reference to FIGS. 1 to 11.

What is meant by a motor vehicle is any type of motorized vehicle.

In one nonlimiting embodiment considered in the remainder of the description, the lighting module 10 belongs to an illuminating and/or signaling device. In a nonlimiting alternative form of embodiment, the illuminating and/or signaling device is a motor vehicle headlamp.

As illustrated in FIGS. 1 to 4, the lighting module 10 comprises:
an optical means 3;
a support 5 for the optical means 3;
at least one light source 7 housed in the lighting module 10;
movement means 15 for moving the optical means 3 with respect to the support 5 for the optical means 3, which are arranged so as to allow the optical means 3 to be moved between:
  a locked position for holding said light source 7 on the support 5 for the optical means 3; and
  an unlocked position for removing said light source 7 from the lighting module 10.

The lighting module 10 is designed to emit rays of light 4 forming a light beam. In one nonlimiting example, the lighting module 10 is designed to perform a photometric function known as "high beam" to create a driving light. In another nonlimiting example, the lighting module 10 is designed to perform a photometric function referred to as "low beam" to create, for example, a light for passing oncoming traffic.

The various elements of the lighting module 10 are described in detail hereinafter.

In one nonlimiting embodiment, the support 5 is a heat sink that allows the heat from the light source 7 to be removed from the lighting module 10. The support 5 is fixed in the lighting module 10. As will be seen hereinafter, it is the optical module 3 that is mobile with respect to the support 5 and that will allow the light source 7 to be removed from the lighting module 10.

The light source 7 is designed to collaborate with the optical module 3 and comprises:
light emitting means 11; and
a mechanical support 13 for the light emitting means 11;
an electrical connection interface 16.

In one nonlimiting embodiment, the light emitting means 11 comprise at least one semiconductor emitting chip.

In a nonlimiting alternative form of embodiment, each semiconductor emitting chip forms part of a light emitting diode. What is meant by a light emitting diode is any type of electroluminescent diode whether this be, in nonlimiting examples, LEDs (Light Emitting Diodes), an (OLED Organic LED) or an AMOLED (Active-Matrix-Organic LED), or even a FOLED (Flexible OLED). The light source 7 is removable, which means to say that it can be removed from the lighting module 10 without removing the optical module 3 from said lighting module 10. The light source 7 is thus interchangeable.

In one nonlimiting embodiment, the light source 7 comprises grab means (described later on) on the mechanical support 13 to make it easier to remove the light source 7 from the lighting module 10.

In one nonlimiting embodiment, the optical means 3 is:
a reflector; or
a lens; or
a light guide; or
a collimator.

The optical means 3 collaborates with the light source 7 to form the rays of light 4.

In one nonlimiting embodiment, in the locked position, the light emitting means 11 of the light source 7 are positioned in a focal zone F of the optical means 3. That makes it possible to have good focusing on the optical module 3 and thereby to optimize the light beam.

In one nonlimiting embodiment, the optical means 3 comprises at least one end stop 14 so as to allow the light emitting means 11 to be blocked and held in position, namely kept at the focus F of the optical means 3. Said at least one end stop 14 is thus an isostatic reference of the light source 7 along an axis X parallel to the support 5.

In a nonlimiting alternative form of embodiment, the optical means 3 comprises two end stops 14. The two end stops 14 are designed to collaborate with secondary reference points 131 of the light source 7 (which are described later on).

In a locked position, the mechanical support 13 of the light emitting means 11 is:
blocked horizontally against said at least one end stop 14;
blocked vertically by the optical means 3 against the support 5 of this optical means 3.

More specifically, the optical means 3 comprises a base 30, said base 30 allowing pressure to be applied to the protective hood 8 (described later on) of the light source 7 via the primary reference points 130 (described later on) so as to block the mechanical support 13 of the light emitting means 11 against the support 5 for the optical means 3.

The light source 7 is thus held in position in the optical module 3.

In an unlocked position, the optical means 3 no longer presses against the mechanical support 13 and the latter is free in the lighting module 10.

In this unlocked position, a space E is created between the support 5 and the optical module 3, allowing the light source 7 to be freed and exchanged. It will be noted that this space E is also large enough to clean any residue from the thermal interface located between the light source 7, more particularly between the mechanical support 13 thereof and the support 5 of the optical module 3. It will be recalled that this thermal interface provides thermal conductivity between the support 5 and the light source 7.

Movement means 15 are thus designed to allow the optical means 3 to move with respect to its support 5 between the locked position and the unlocked position. The optical means 3 is thus mobile with respect to its support 5, the latter being fixedly mounted in the lighting module 10. The support 5 is thus not mobile in the lighting module 10. Movement of the optical means 3 with respect to its support 5 is a translational and/or rotational movement as described later on.

Figure 5:
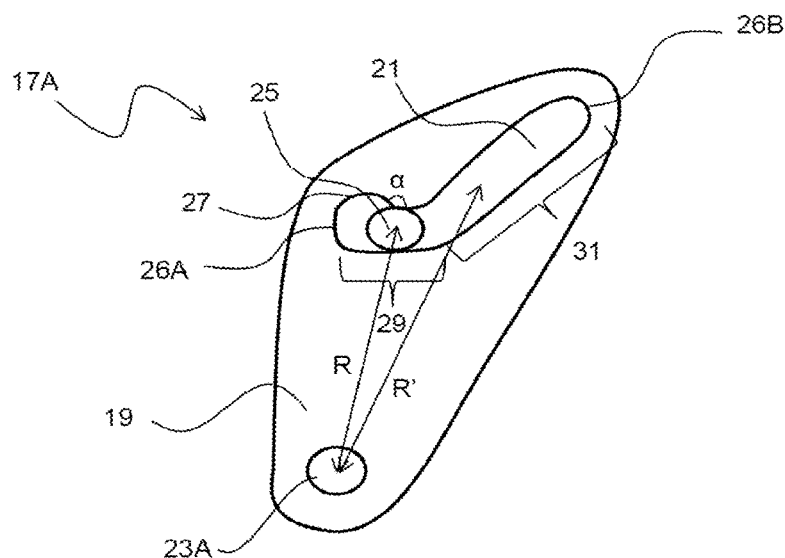
FIG. 5 is an enlarged view of a cam system used in the lighting modules of FIGS. 1 to 4.

These movement means 15 are illustrated more specifically in FIG. 5.

In one nonlimiting embodiment, these movement means 15 comprise a cam system 17A. This cam system 17A comprises:
- a cam 19 comprising a slot 21;
- a pivot 23A secured to the support 5 for the optical means 3 and designed to allow the cam 19 to rotate with respect to said optical means 3 support 5;
- a stud 25 secured to the optical means 3 and designed to slide in the slot 21 of the cam 19 as said cam 19 rotates.

The cam system 17A allows a rotational movement of the cam 19 about the pivot 23A to be converted in a simple way into a translational and/or rotational movement of the optical means 3. To achieve that, the cam 19 comprises the slot 21 in which a stud 25 secured to the optical means 3 is designed to slide therein. The slot 21 thus has an oblong shape with a rounded first end 26A and a rounded second end 26B flanking an elongate intermediate part of the slot 21.

In the locked position, in which the light source 7 is held on the support 5 for the optical means 3, the stud 25 is in contact with the first end 26A of the slot 21. In a nonlimiting alternative form of embodiment, this first end 26 comprises a locking notch 27 to block the cam 19 in the locked position.

In the unlocked position, the stud 25 is in contact with the second end 26B of the slot 21.

In a nonlimiting alternative form of embodiment, the intermediate part of the slot 21 is curved. This allows the stud 25 to be assured a gradual movement along the slot 21 while limiting the risks of this stud becoming jammed in this slot 21.

In another nonlimiting alternative form of embodiment illustrated in FIG. 5, the intermediate part of the slot 21 comprises:
- a first part 29 extending along a constant first radius R centered with respect to the pivot 23A, and
- a second part 31 extending along an evolving second radius R'.

The first part 29 of constant radius R makes the cam 19 easier to unlock. It also makes it possible to have a region of material with an obtuse angle a between the locking notch 27 and the first part 29 of the intermediate part.

That makes it possible to have a hard point for blocking the stud 25 in the locking notch 27.

The second part 31 of progressive radius R' improves the movement of the stud 25 along the slot 21.

Various nonlimiting embodiments are described hereinafter.

First Embodiment

Figure 2:
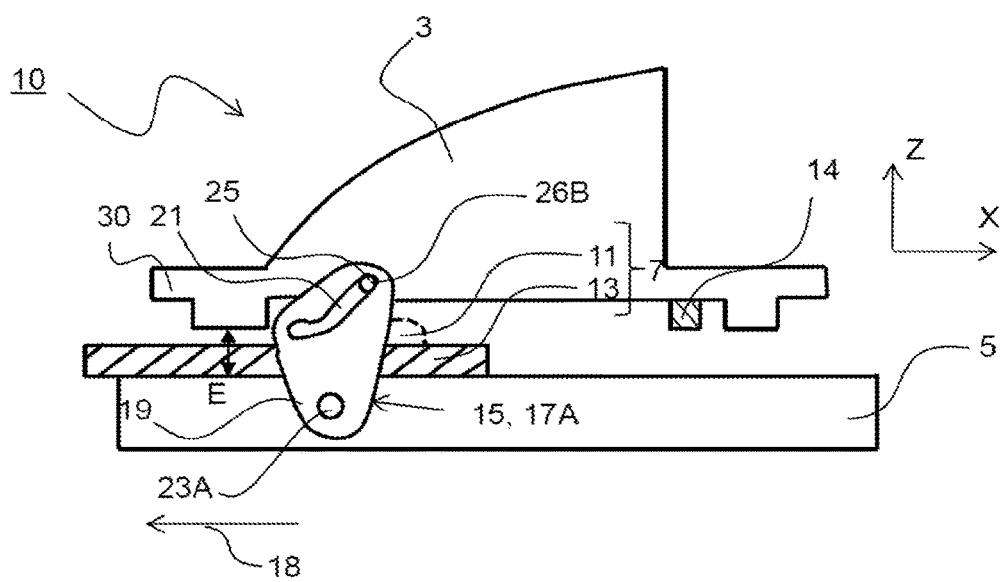

FIGS. 1 and 2 schematically depict a lighting module 10 for a motor vehicle according to a nonlimiting first embodiment.

According to this embodiment, the movement means 15 are arranged so as to move the optical means 3 translationally along an axis Z perpendicular to the support 5. They comprise the cam system 17A described previously.

In one nonlimiting embodiment, the optical means 3 of the lighting module 10 comprises two end stops 14.

FIG. 1 shows the movement means 15 of the optical means 3 in a locked position. In this locked position, the light source 7 is blocked horizontally (along the axis X) by the two end stops 14 and vertically (along the axis Z) by the optical means 3 (notably by the base 30 of said optical means 3) against the support 5 for this optical means 3. The stud 25 of the cam system 17A is housed in the locking notch 27. The light emitting means 11 are arranged at the focus F of the optical means 3 so that the rays of light 4 coming from these emission means 11 are reflected by the optical means 3.

An operator can act on the cam 19 and turn this cam 19 about the pivot 23A, in a counterclockwise direction of rotation. As the cam 19 rotates, the stud 25 slides along the slot 21 and raises the optical means 3 translationally in a direction along the axis Z.

FIG. 2 shows the movement means 15 for moving the optical means 3 in a position in which the optical means 3 is completely unlocked. In this position, the stud 25 is blocked against the second end 26B of the slot 21. The cam 19 can then no longer turn in the counterclockwise direction of rotation. A space E is thus created between the optical means 3 and the support 5. Via this space E it is possible to make the mechanical support 13 for the light emitting means 11 slide along the support 5 for the optical module 3 in order to remove the light source 7 from the lighting module 10 via the rear of this lighting module 10 (in the direction of the arrow 18). Once removed, the operator can fit a new light source 17 and block it against the end stops 14.

By turning the cam 19 in the clockwise direction, it is possible to move the optical means 3 once again into its locked position in order to hold the new light source 7 on the isostatism of the optical means 3, namely to hold the new light source 7 on the support 5 for the optical means 3 in the correct position, using the end stops 14 and the base 30 of the optical means 3. In order to increase the space E at the rear of the lighting module 10 still further, it is possible to angle the optical means 3 forwards in rotation about the pin 25 after the translational movement along the axis Z.

Second Embodiment

Figure 3:
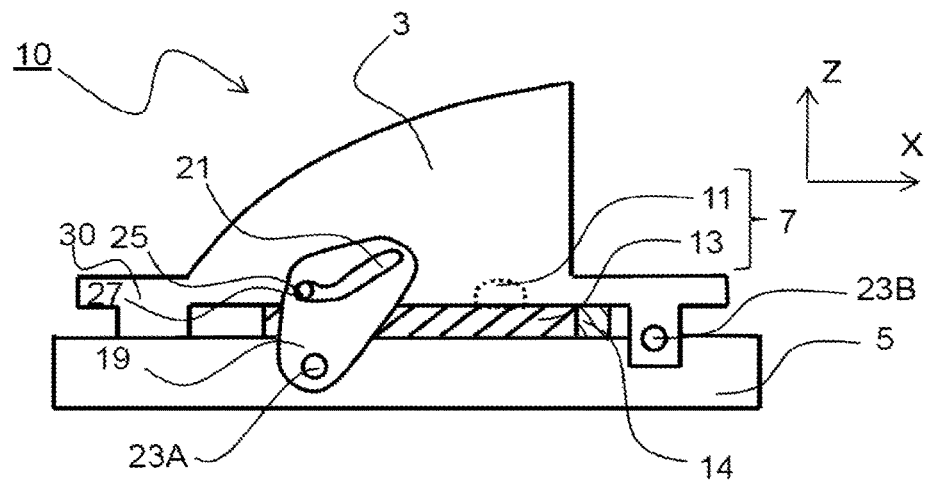
FIGS. 3 and 4 schematically depict a lighting module for a motor vehicle according to a second nonlimiting embodiment of the invention.
Figure 4:
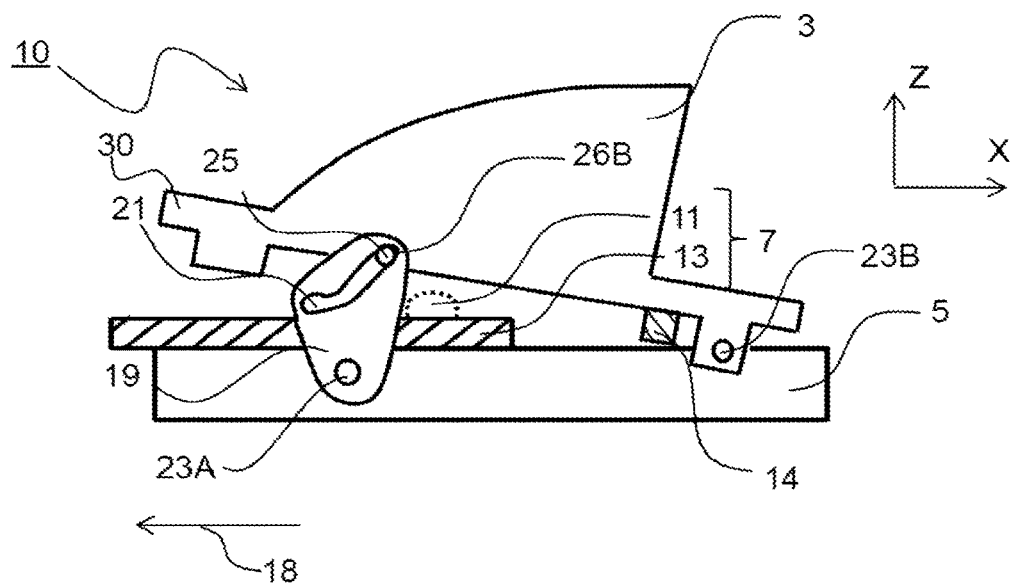

FIGS. 3 and 4 schematically depict a lighting module 10 for a motor vehicle according to a nonlimiting second embodiment.

According to this embodiment, the movement means 15 are designed to move the optical means 3 rotationally. They comprise the cam system 17A described hereinabove.

In one nonlimiting embodiment, the optical means 3 of the lighting module 10 comprises two end stops 14.

FIG. 3 shows the movement means 15 for moving the optical means 3 in a locked position. In this locked position, the light source 7 is blocked horizontally (along the axis X) by the end stops 14 and vertically (along the axis Z) by the optical means 3 (notably by the base 30 of said optical means 3) against the support 5 for this optical means 3. The stud 25 of the cam system 17A is housed in the locking notch 27.

An operator can act on the cam 19 and turn this cam 19 about the pivot 23A in a counterclockwise direction. As the cam 19 rotates, the stud 25 slides along the slot 21 and the optical means 3 rotates about a secondary pivot 23 secured to the support 5 for the optical means 3 in such a way as to create a space E at the rear of the lighting module 10.

FIG. 4 depicts the movement means 15 that move the optical means 3 in a position in which the optical means 3 is completely unlocked. In this position, the stud 25 is blocked against the second end 26B of the slot 21. The cam 19 can no longer rotate in the counterclockwise direction. Via the space E it is possible to make the mechanical support 13 of the light emitting means 11 slide along the support 5 for the optical module 3 in order to remove the light source 7 from the lighting module 10 via the rear of this lighting module 10 (in the direction of the arrow 18). Once removed, the operator can fit a new light source 17 and block it against the end stops 14. By turning the cam 19 in the clockwise direction it is possible to move the optical means 3 back into its locked position in order to hold the new light source 7 on the isostatism of the optical means 3, namely to hold the new light source 7 on the support 5 for the optical means 3 in the correct position, thanks to the end stops 14 and to the base 30 of the optical means 3.

Figure 6:
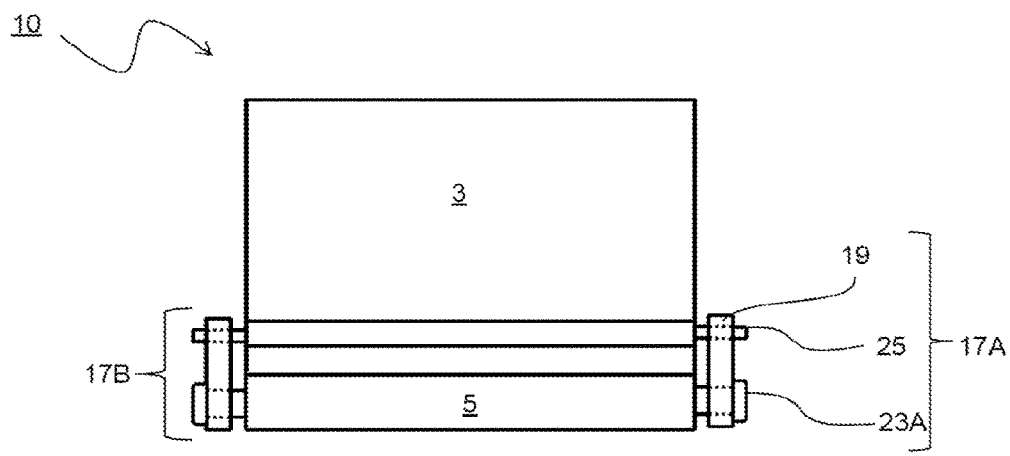
FIGS. 6 and 7 schematically depict an alternative form of embodiment of the lighting module comprising two cam systems of FIGS. 1 to 5.
Figure 7:
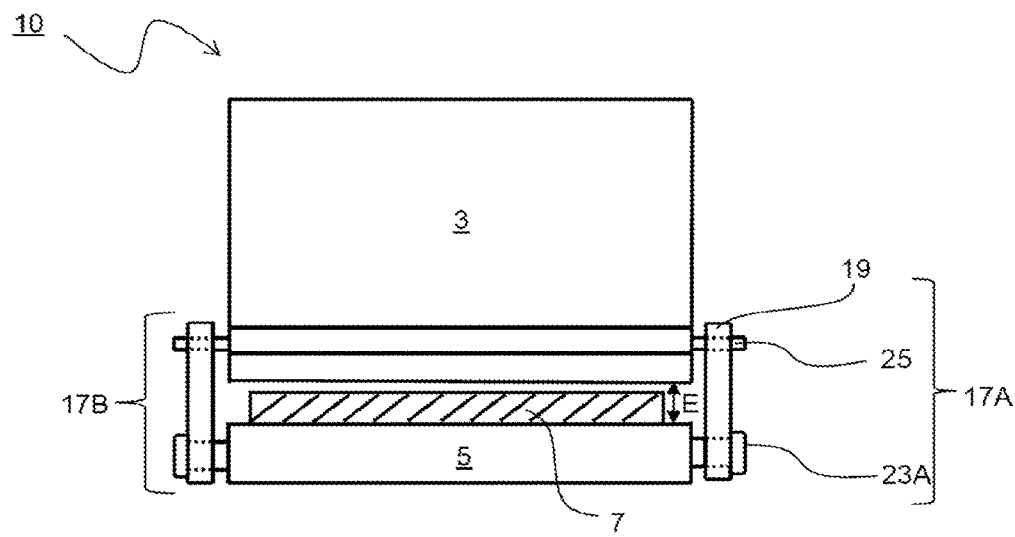
Figure 8:
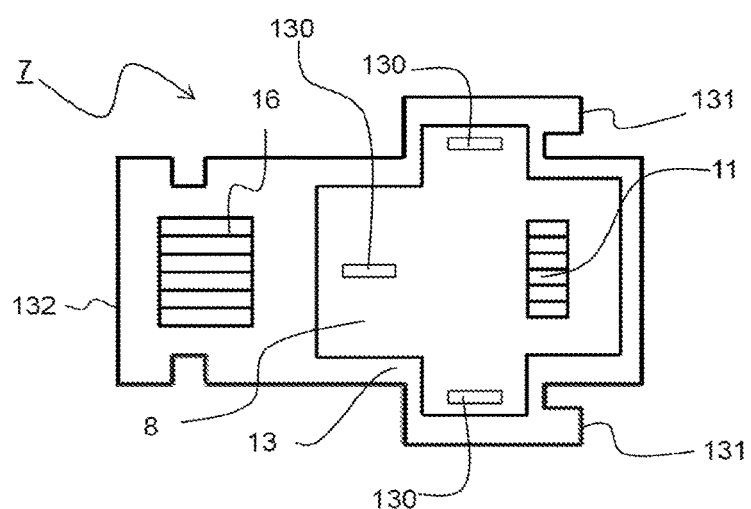
FIG. 8 schematically depicts a light source used in the lighting modules of FIGS. 1 to 7 according to one nonlimiting embodiment, said light source comprising a protective hood.

According to an alternative form of the nonlimiting first and second embodiments described hereinabove, which is illustrated in FIGS. 6 and 7 (rear view of the lighting module 10), the movement means 15 comprise two cam systems 17A, 17B. The two cam systems are arranged facing one another on each side of the optical means 3. By using these two cam systems 17A, 17B the risks of the stud 25 becoming jammed in the slot 21 of the cam 19 are limited. The movement of the optical means 3 between the locked position and the unlocked position is therefore easier. In FIG. 6, the optical means 3 is in a locked position and the light source is held on the support 5 for the optical means 3 as described earlier.

In FIG. 7, the optical means 3 is in an unlocked position, so that it is possible to remove the light source 7 from the lighting module 10 as described earlier.

The light source 7, designed to be housed in the lighting module 10 (described previously according to the first and second embodiments) for a motor vehicle, is described in greater detail with reference to FIGS. 8 to 11.

In one nonlimiting embodiment, the light source 7 comprises a plurality of light emitting means 11. In the nonlimiting example illustrated in FIGS. 8 to 11, there are six light emitting means.

This light source 7 comprises:
light emitting means 11;
a mechanical support 13 for the light emitting means 11, comprising:
  primary reference points 130 (also referred to as Z-reference points) against which the optical module 3 (particularly the base 30 thereof) presses when the optical module 3 is in the locked position so as to press the mechanical support 13 firmly against the support 5;
  secondary reference points 131 (also referred to as X-reference points) designed to come into contact with said at least one end stop 14 of the lighting module 3;
an electrical connection interface 16 for electrically powering and controlling the light emitting means 11.

The electrical connection interface 16 is designed to collaborate with an external electrical connector (not illustrated) that allows power and control commands to be sent to the light source 7.

In one nonlimiting embodiment, the light source 7 comprises three primary reference points 130. In one nonlimiting embodiment, the three primary reference points 130 are designed to collaborate with the base 30 of the optical module 3 when said optical module 3 is in the locked position.

In one nonlimiting embodiment, the primary reference points 130 are pegs which fit into corresponding shapes (not illustrated) of the optical module 3. In this case, the base 30 of the optical module 3 has a thickness in which these corresponding shapes are formed. The corresponding shapes press against the pegs 130 in such a way that in the locked position the optical module 3 holds the light source 7 in position along the axis Z. The base 30 thus makes it possible to manage the isostatism in Z of the light source 7 via the primary reference points 130.

In one nonlimiting embodiment illustrated in FIGS. 8 to 11, the light source 7 further comprises a protective cover 8. The protective cover 8 comprises an opening to allow the light emitted by the light source 7 to pass. In this case, the primary reference points 130 are arranged on the protective cover 8. In the nonlimiting example of FIG. 8, three pegs correspond to the primary reference points 130.

In one nonlimiting embodiment, the light source 7 comprises two secondary reference points 131. In a nonlimiting alternative form of embodiment, the two secondary reference points 131 are distributed on each side of the light emitting means 11.

The two secondary reference points 131 are designed to collaborate respectively with the two end stops 14 of the optical module 3 which were described hereinabove. When the light source 7 is positioned on the support 5, the two secondary reference points 131 come into contact with the two end stops 14 respectively.

The end stops 14 thus allow control over the isostatism in X of the light source 7 via the secondary reference points 131.

Figure 9:
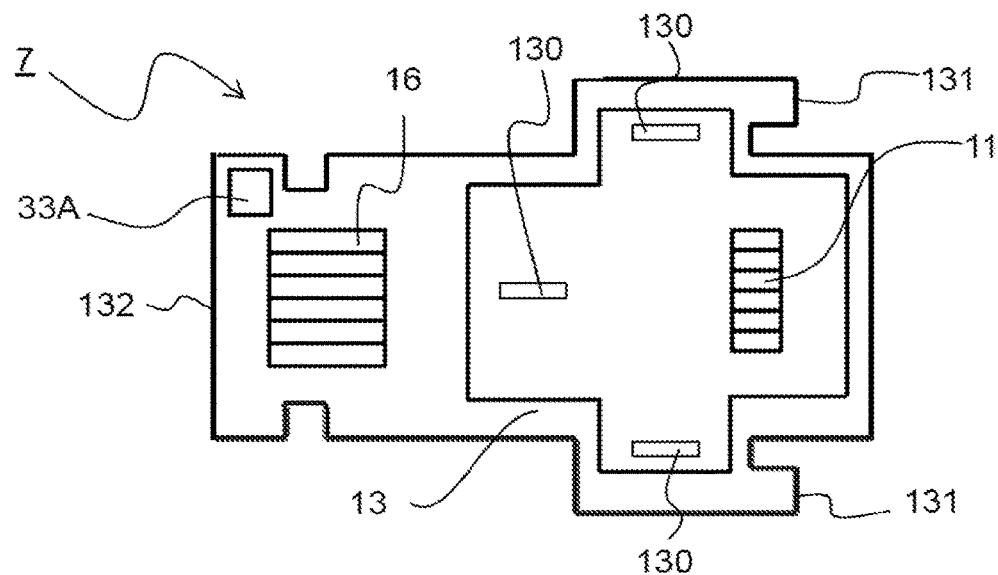
FIGS. 9 to 11 schematically depict nonlimiting embodiments of a light source used in the lighting modules of FIGS. 1 to 7, said light source comprising grab means.
Figure 10:
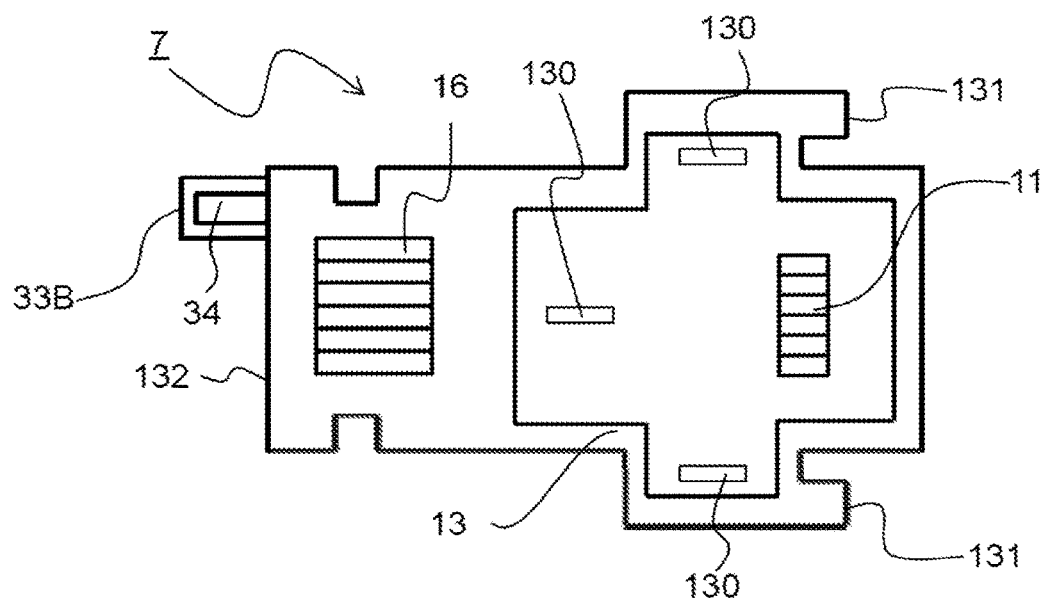
Figure 11:
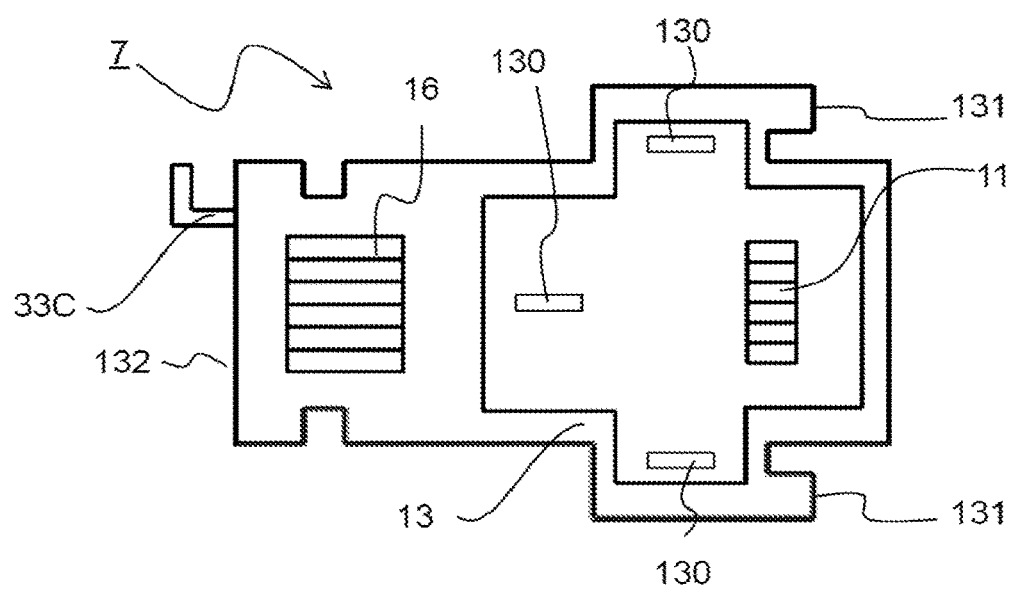

In one nonlimiting embodiment illustrated in FIGS. 9 to 11, the light source 7 further comprises grab means 33A, 33B, 33C on said mechanical support 13.

These grab means are arranged on said mechanical support 13 near the electrical connection interface 16. In particular, they are arranged on the end 132 of the mechanical support 13 which is the opposite end to the secondary reference points 131 described earlier.

It will be noted that these grab means are arranged on said mechanical support 13 in such a way as not to impede connection between an external electrical connector and the electrical connection interface 16.

In FIG. 9, in a first nonlimiting alternative form of embodiment, the grab means take the form of a notch 33A recessed into the mechanical support 13.

In FIG. 10, in a second nonlimiting alternative form of embodiment, the grab means take the form of a lug 33B extending the mechanical support 13 and defining an attachment zone 34 for the removal of the light source 7 from the lighting module 10.

In FIG. 11, in a third nonlimiting alternative form of embodiment, the grab means take the form of a bent rod 33C defining a substantially right-angled attachment angle.

The grab means 33A, 33B, 33C can be actuated by an operator using a rod comprising a hook. The hook is able to become lodged in the notch 33A, in the lug 33B or in the bent rod 33C to make it easier to remove the light source 7 from the lighting module 10.

Of course, the description of the invention is not restricted to the embodiments described hereinabove.

Thus, in one nonlimiting embodiment, the cam 19 may have two locking notches 27 at each end of the slot. In this way, the optical means 3 is blocked in the locked position and in the unlocked position.

Thus, in one nonlimiting embodiment, the lighting module may comprise return means, such as a return spring, for returning the optical means 3 to the locked position thereof. For example, this return spring is fixed both to the support 5 and to the optical means 3.

Thus, in one nonlimiting embodiment, the grab means may comprise two notches 33A or two lugs 33B or two bent rods 33C distributed on each side of the electrical connection interface 16.

Thus, in one nonlimiting embodiment, the light source 7 is able not to have a protective cover 8. In that case, there are three primary reference points 130 directly on the mechanical support 13 and the optical module 3 will come to bear against these three primary reference points 130 in the locked position.

Thus, in one nonlimiting embodiment, the base 30 may comprise a housing (not illustrated) which is designed to accommodate, in part, the light source 7, particularly the mechanical support 13 for said light source 7. In that case, the housing (particularly the bottom of the housing) is designed for pressing the light source 7 against the support 5 via the primary reference points 130.

The housing thus allows control over the isostatism in Z of the light source 7, using the primary reference points 130.

Thus, the invention described notably offers the following advantages:
- easier replacement of a defective light source;
- there is no need to remove the optical means 3 in order to perform the replacement operation;
- there is no need to scrap the entire optical module 3 just to replace a light source, thereby appreciably reducing the cost of replacing said light source;
- once the light source has been removed, it is possible to identify and change only the defective element of this light source 7;
- use is made of a system that is simple to manipulate in order to release the light source. All the operator needs to do is to unblock the cam to begin to turn it and move the optical means 3;
- the locking notch 27 allows the optical means 3 to be immobilized in its locked position and this prevents any movement of this optical means 3 while the motor vehicle is being used.

The invention claimed is:

1. A lighting module for a motor vehicle, said lighting module comprising:
   at least one removable light source housed in the lighting module and comprising:
      a light emitting element;
      a mechanical support for the light emitting element;
   optical means exhibiting a focal zone, for altering an optical characteristic of light emitted by said light emitting element;
   a support for supporting the optical means;
   movement means for permitting movement of the optical means between:
      a predetermined locked position with respect to said light source, wherein the optical means in the locked position is secured on the support for the optical means with the light emitting element at the focal zone of the optical means; and
      an unlocked position permitting removal of said light source from the lighting module, wherein the optical means in the unlocked position is separated, in a direction of separation, from the support for supporting the optical means and is displaced, in a direction perpendicular to the direction of separation, from a position where the light emitting element is at the focal zone of the optical means,
   wherein said optical means includes a stop element that fixes a position of the mechanical support for the light emitting element with respect to said optical means in the direction perpendicular to the direction of separation when said optical means is in the predetermined locked position, such that the light emitting element is at the focal zone of the optical means.

2. The lighting module according to claim 1, wherein the movement means moves the optical means in at least one of translational and rotational directions.

3. The light module according to claim 2, wherein the movement means comprises a cam system.

4. The lighting module according to claim 1, wherein the movement means comprise a cam system.

5. The lighting module according to claim 4, wherein said cam system comprises:
   a cam comprising a slot;
   a pivot secured to the support for the optical means and designed to allow the cam to rotate with respect to said optical means support;
   a stud secured to the optical means and designed to slide in the slot of the cam as said cam rotates.

6. The lighting module according to claim 5, wherein the slot of the cam comprises a locking notch for blocking the cam in the position in which the optical means is locked.

7. The lighting module according to claim 6, wherein the slot of the cam is oblong in shape.

8. The lighting module according to claim 5, wherein the slot of the cam is oblong in shape.

9. The lighting module according to claim 8, wherein the slot of the cam is curved.

10. The lighting module according to claim 5, wherein the slot of the cam is curved.

11. The lighting module according to claim 5, in which the slot comprises a first part extending with a constant first radius (R) centered with respect to the pivot, and a second part extending along a second radius (R') that evolves.

12. The lighting module according to claim 5, wherein the movement means further comprise a secondary pivot secured to the support for the optical means and designed to allow the optical means to rotate about this secondary pivot as the cam rotates about the pivot.

13. The lighting module according to claim 5, in which the movement means comprise a secondary cam system, the two cam systems being arranged facing one another on each side of the optical means.

14. The lighting module according to claim 1, wherein said at least one light source further comprises grab means on said mechanical support, permitting said mechanical support to be manually gripped such that the light emitting element can be removed therefrom.

* * * * *